United States Patent [19]

Takayama et al.

[11] Patent Number: 5,050,457

[45] Date of Patent: Sep. 24, 1991

[54] CONTINUOUSLY VARIABLE TRANSMISSION

[75] Inventors: Mitsunao Takayama; Tsutomu Yasue; Akiyoshi Morishita; Kozo Yamauchi, all of Nagoya, Japan

[73] Assignee: Aichi Kikai Kogyo Kabushiki Kaisha, Nagoya, Japan

[21] Appl. No.: 378,085

[22] Filed: Jul. 11, 1989

[51] Int. Cl.$^5$ .................. B60K 41/04; F16H 37/06
[52] U.S. Cl. ........................... 74/866; 74/856; 74/861; 74/664; 192/44; 474/12; 474/70
[58] Field of Search .......... 74/856, 689, 664, 665 GE, 74/861, 865, 866, 745; 192/44, 38; 474/11, 12, 15, 70

[56] References Cited

U.S. PATENT DOCUMENTS

| | | | |
|---|---|---|---|
| 3,300,002 | 1/1967 | Roper | 192/38 X |
| 3,340,749 | 9/1967 | Magg et al. | 74/689 |
| 4,434,878 | 3/1984 | Okubo | 192/44 X |
| 4,553,450 | 11/1985 | Gizard | 74/689 |
| 4,630,504 | 12/1986 | Smirl | 74/689 |
| 4,727,771 | 3/1988 | Niwa et al. | 74/861 X |
| 4,779,488 | 10/1988 | Takano et al. | 74/745 |
| 4,852,707 | 8/1989 | Ito et al. | 192/44 |

FOREIGN PATENT DOCUMENTS

| | | | |
|---|---|---|---|
| 1121165 | 4/1956 | France | 474/15 |
| 943164 | 11/1963 | United Kingdom | 474/15 |

Primary Examiner—Allan D. Herrmann
Assistant Examiner—Benjamin Levi
Attorney, Agent, or Firm—Dennison, Meserole, Pollack & Scheiner

[57] ABSTRACT

In the V belt type continuously variable transmission, after the output power from the prime mover has been transmitted to the input pulley shaft, two paths are operable to transmit the output power from the input pulley shaft to the output pulley shaft, two paths which are a main power transmitting path through a V belt engaged between the input pulley and the output pulley and a sub power transmitting path through the 2-way differential clutch. The drive ratio of the sub power transmitting path is set in a slightly smaller value than the maximum drive ratio of the main power transmitting path. When the movable input half pulley of the input pulley has been moved near the position of the maximum drive ratio in the main power transmitting path, the rotational speed of the output gear in the 2-way differential clutch become slower than that of the input gear, and as a result a rotational force is given to the output gear so that the output pulley shaft is rotated through the sub power transmitting path in addition to the main power transmitting path so that it becomes possible to increase driving power and accelerating force and also to decrease load to be added to the V belt.

2 Claims, 15 Drawing Sheets

CONTINUOUSLY VARIABLE TRANSMISSION

BACKGROUND OF THE INVENTION

1. Field of the invention

The present invention relates to a V-shaped belt (hereinafter referred to as V belt) type continuously variable transmission.

2. Description of the Prior Art

In general, a V belt type continuously variable transmission contains an input pulley composed of a pair of half pulleys mounted on an input pulley shaft to move axially toward and away from each other, an output pulley composed of a pair of half pulleys mounted on an output pulley shaft to move axially toward and away from each other, and a V belt which frictionally engages the pulleys to transmit the rotation from the input pulley shaft to the output pulley shaft to vary the rotational speed continuously.

The means to transmit the rotation between both pulley shafts depends upon the V belt member only in the V belt type continuously variable transmission which is actually used at present. In such a construction, there are several defects as follows;

Firstly the allowable transmission capacity is limited by the V belt becomes strength so that the improvement of the transmission capacity and the compaction of the construction are obstructed.

Secondly when the V belt stuck into the groove between half pulleys of the output pulley shaft because the vehicle stopped suddenly and its wheels and the output pulley shaft connected to them are brought to stop, power transmitting becomes impossible. Or, the drive ratio is made to the higher position so that the restart becomes difficult or the acceleration is not accomplished satisfactorily due to weak drive power.

If the movable input half pulley is forced to be moved by large power to change the drive ratio in the state when the V belt stuck, the pulley or V belt is damaged.

When the V belt is cut away, it goes without saying that the vehicle becomes impossible to operate.

To overcome those defects, countermeasures have been proposes to include a sub power transmitting path which is provided in addition to the power transmitting path with the V belt so that either one of them selectively transmits its output power through a hydraulic clutch or the like to the wheels in compliance with the drive ratio.

The above proposed construction, however, still has the following problems.

Firstly switching of the paths is accompanied by shock.

Secondly, two clutches are required at least to switch respective output from each power transmitting path so that the construction becomes large size with great weight and high production cost, and controlling of the system tends to be complicated.

Thirdly, condition of sliding malfunction or sticking of V belt is apt to be irregular so that judgment of the condition is difficult and effective recovery action is not performed.

Furthermore, in a V belt type continuously variable transmission of this kind, as shown in FIG. 16, one input half pulley B of a pair of input half pulleys B, C mounted on a input pulley shaft A is made to move axially along the input pulley shaft and the position of the input half pulley B is controlled by a half pulley position control D operated through an actuator not shown. The half pulley position control D contains an outer slider E to be rotatably operated by the actuator and an inner slider F to be engaged through screw with the outer slider E which supports the rear end of the input movable half pulley B. Consequently, when the outer slider E moves toward and away along the input pulley shaft through the actuator, the input movable half pulley B is moved to be controlled in its position. In such conventional V belt type continuously variable transmission, however, the axial load due to the V belt H during operation is directly added to the power transmitting members of the actuator such as a bearing G, an outer slider E, etc. so that these members, for instance the bearing G, are damaged or great operating power is necessary for the actuator.

SUMMARY OF THE INVENTION

An object of the present invention is to provide a V belt type continuously variable transmission having a main power transmitting path and a sub power transmitting path for transmitting driving power toward the output pulley shaft through both paths according to engine operating conditions in order to increase driving power and accelerating force and also to decrease load to be added to the V belt.

Another object of the present invention is to provide a V belt type continuously variable transmission having a 2-way differential clutch for switching the forward and backward rotation transmitted through the sub power transmitting path so that the construction and controlling are simplified and weight of the continuously variable transmission is decreased because of saving numbers of clutches to be required.

A further object of the present invention is to provide a V belt type continuously variable transmission having a 2-way differential clutch for switching the forward and backward rotation transmitted through the sub power transmitting path so that assembly of the V belt type continuously variable transmission can be easily performed.

A still further object of the present invention is to provide a V belt type continuously variable transmission having a main power transmitting path and a sub power transmitting path for transmitting cooperatively driving power toward the output pulley shaft through both paths at the range near the maximum drive ratio so that the sufficient driving power and accelerating force can be gained during low speed operation wherein the great torque is required and further the load to the V belt can be decreased. Furthermore, such a V belt type continuously variable transmission has the advantage that switching of the rotational direction can be easily performed at shifting of the selector and that the damage or sticking of the V belt can be smoothly recovered.

A still further object of the present invention is to provide a V belt type continuously variable transmission having a drive ratio control with simplified construction.

A still further object of the present invention is to provide a V belt type continuously variable transmission having a half pulley position control in which the axial force acting on members of the actuator through the movable input half pulley can be decreased so that improvement of the life of the actuator members, decrease of the driving torque through the actuator, and smooth shifting of the drive ratio become possible.

The foregoing objects of the invention are accomplished by providing a V belt type continuously variable transmission comprising: main power transmitting path means having a V belt which is frictionally engaged between an input pulley composed of a pair of half pulleys mounted on an input pulley shaft to move axially toward and away from each other and an output pulley composed of a pair of half pulleys mounted on an output pulley shaft to move axially toward and away from each other, the main power transmitting path means continuously varying the rotation of the input pulley shaft to transmit it to the output pulley shaft; sub power transmitting path means being independent of the main power transmitting path means to transmit the rotation of the input pulley shaft to the output pulley shaft; and control means causing both the main and sub power transmitting paths to perform cooperative power transmission according to the engine operating condition.

The control means mentioned above is preferably composed of a 2-way differential clutch provided in the sub power transmitting path.

The 2-way differential clutch is preferably mounted on the countershaft provided between the input pulley shaft and output pulley shaft.

The drive ratio through the sub power transmitting path is preferably set in a slightly smaller value than the maximum value of the drive ratio through the main power transmitting path.

The control of the drive ratio is preferably composed of a sensor detecting the drive ratio of the main power transmitting path, a sensor detecting the position of the movable half pulley of the input pulley, a sensor detecting the shift position of the selector, an actuator moving the movable half pulley according to signals from those sensors, and a control unit operating the actuator to set the values of the drive ratio and the rotational speed of the input pulley shaft according to the engine operating condition.

Furthermore, the last object mentioned above of the present invention is accomplished by providing a V belt type continuously variable transmission having a V belt which is frictionally engaged between an input pulley composed of a pair of half pulleys mounted on an input pulley shaft to move axially toward and away from each other and an output pulley composed of a pair of half pulleys mounted on an output pulley shaft, the V belt continuously varying the rotation of the input pulley shaft to transmit it to the output pulley shaft; and a half pulley position control to be operated by an actuator to control the position of the movable input half pulley of the input pulley, the half pulley position control having a spring biasing the movable input half pulley in the opposite direction against the axial force imposing the V belt.

BRIEF DESCRIPTION OF THE DRAWINGS

The objects and features of the invention may be understood with reference to the following detailed description of an illustrative embodiment of the invention, taken together with the accompanying drawings in which.

DESCRIPTION OF THE PREFERRED EMBODIMENT

Figure 1:
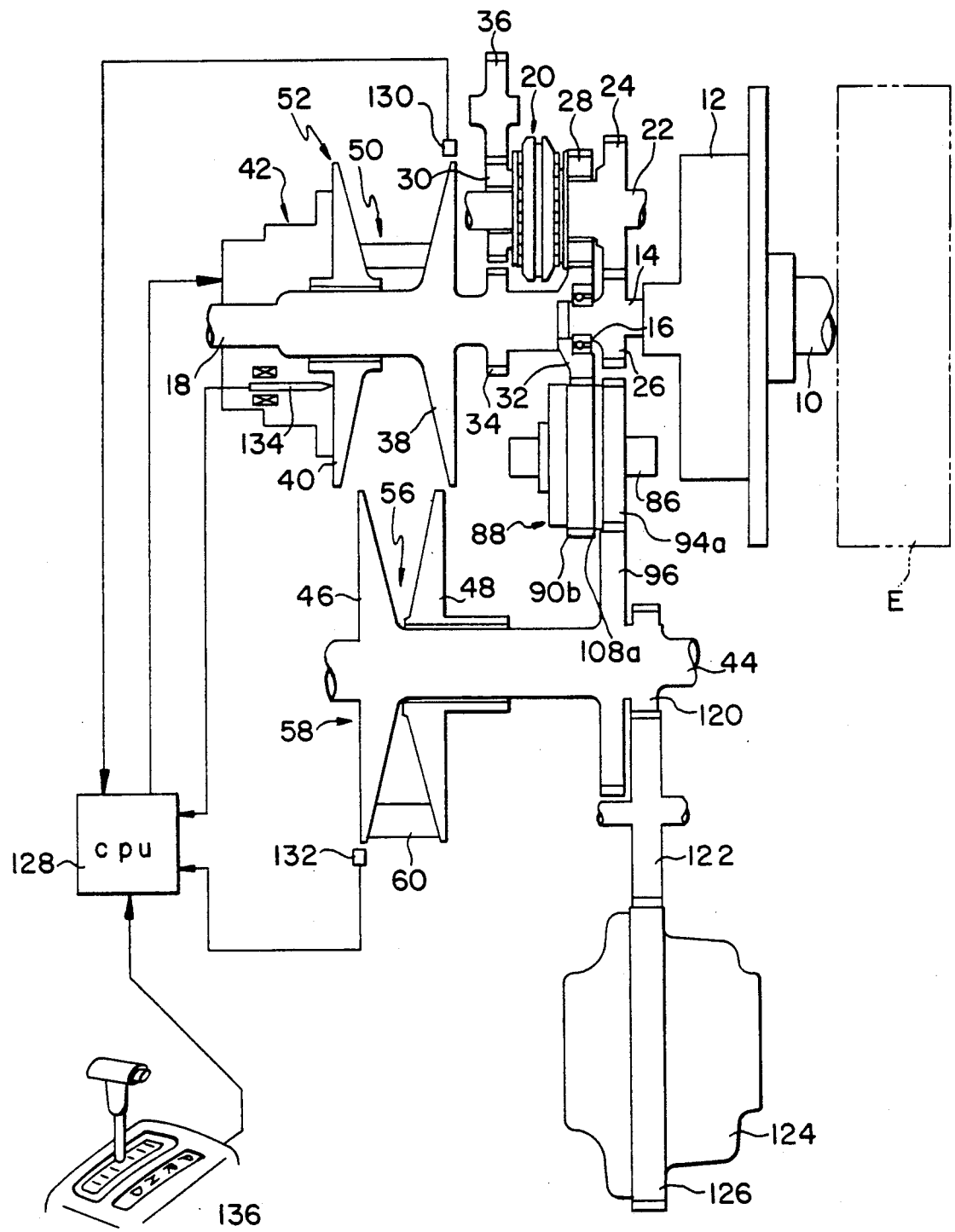
FIG. 1 is a diagrammatic illustration of an entire construction of a V belt type continuously variable transmission.

Referring to FIG. 1, there is shown a V belt type continuously variable transmission in which an output shaft 10 of a prime mover E such as an internal combustion engine is coaxially connected to a main drive shaft 14 through a clutch 12. The end of the main drive shaft 14 is also coaxially connected to an input pulley shaft 18 through a bearing 16.

Parallel to the main drive shaft 14 and the input pulley shaft 18 there is arranged a shaft 22 of a synchro-coupling 20 for switching forward and backward movement, and a counter driven gear 24 which is secured to the shaft 22 and engaged with a main drive gear 26 secured to the main drive shaft 14. Moreover, on the shaft 22 of the synchro-coupling 20 a forward counter gear 28 and a backward counter gear 30 are slidably mounted, and the rotation of the shaft 22 is transmitted to these gears 28, 30 while switching to forward or backward movement. The forward counter gear 28 engages with No. 1 pulley shaft gear 32 which is secured to the end of the input pulley shaft 18, while the backward counter gear 30 engages with an idler gear 36 which engages with No. 2 pulley shaft gear 34 secured to the midway of the input pulley shaft 18.

The rest part of the input pulley shaft 18 is provided with a stationary input half pulley 38 secured thereto, a movable input half pulley 40 slidably inserted thereon, and a half pulley position control 42 to control the position of the movable input half pulley 40 in the axial direction.

Parallel to the input pulley shaft 18 there is arranged an output pulley shaft 44, which is provided with a stationary output half pulley 46 secured thereto and a movable output half pulley 48 mounted thereon to move in the axial direction. The movable part 48 of output pulley 58, as mentioned, is slidably on the output pulley shaft 44 and is forced in a direction toward the stationary part of pulley 58 by means of a coil spring not shown. Thus, no control feature is necessary for operational movement of the part 48.

The stationary input half pulley 38 and movable input half pulley 40 have respective opposite conical surfaces to form a V-shaped groove 50 therebetween to thereby constitute an input pulley 52. Also the stationary output half pulley 46 and movable output half pulley 48 have respective opposite conical surfaces to form a V-shaped groove 56 therebetween to thereby constitute an output pulley 58. The input pulley 52 and output pulley 58 are frictionally engaged through respective V-shaped grooves 50 and 56 by a V belt 60, which causes continuously to vary the drive ratio of the rotation between the input pulley shaft 18 and output pulley shaft 44 when the half pulley position control 42 governs the position of the movable input half pulley 40 to vary the width of the V-shaped groove 50.

Figure 3:
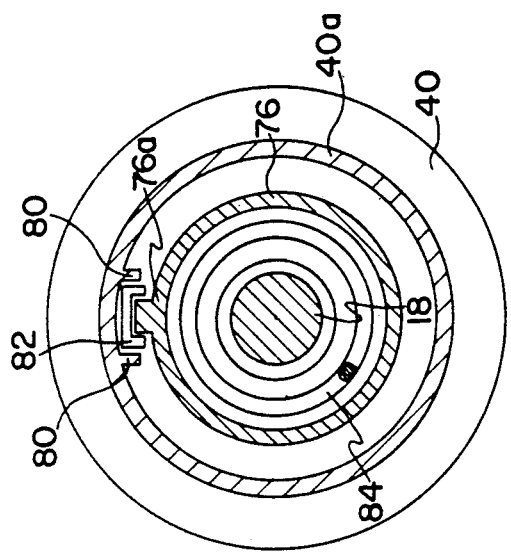
FIG. 3 is a sectional view taken along line III—III in FIG. 2.
Figure 2:
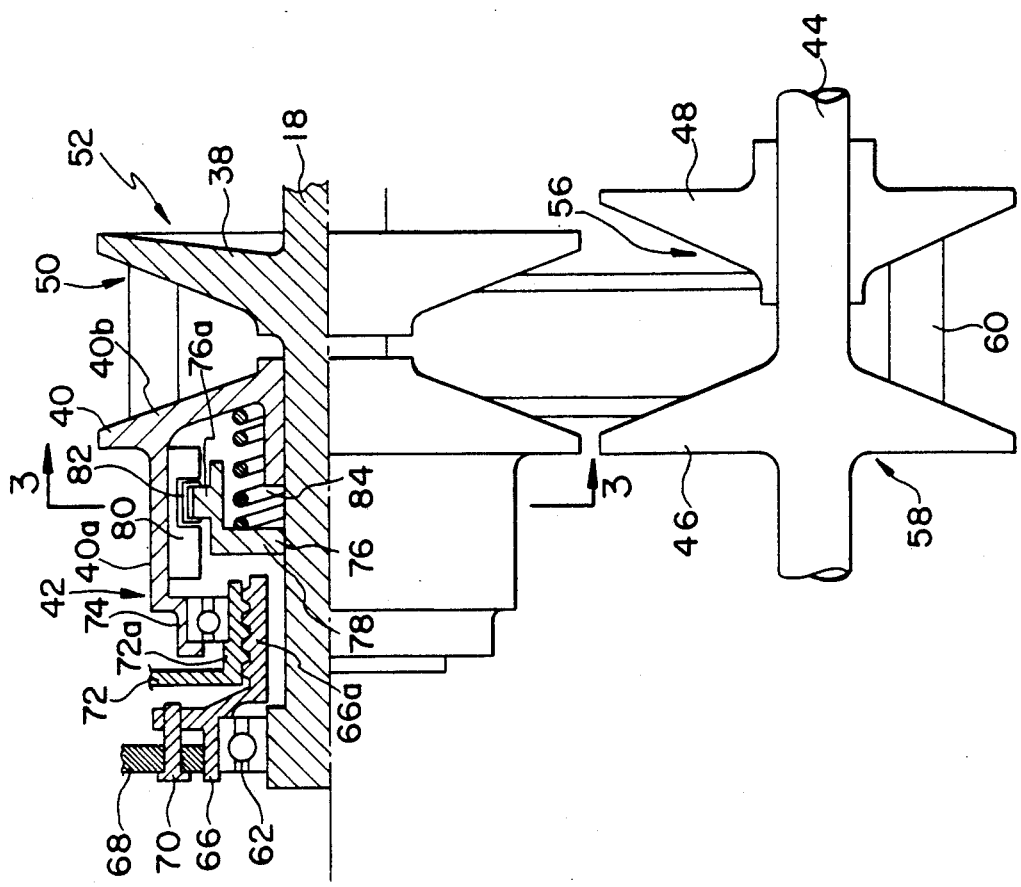
FIG. 2 is an enlarged side elevation view, partly in half cross section, of a movable half pulley position control of the in pulley shown in FIG. 1

Referring now to FIGS. 2 and 3 there is shown the construction of the half pulley position control 42. In FIG. 2, the end of the input pulley shaft 18 is provided with a bearing 62, which supports an inner slider 66 integrally having a cylindrical portion 66a with a male screw. The inner slider 66 is fixed with pins 70 to a case 68, (partly shown in FIG. 2), covering the front area of the movable input half pulley 40. The case 68 is mounted on a stationary part (not shown). The cylindrical portion 66a with the male screw extends axially along the input pulley shaft 18 with appropriate clearance to engage cylindrical portion 72a with female screw of the outer slider 72 which is rotated clockwise or counterclockwise by an actuator (not shown).

The front side portion of the movable input half pulley 40 is integrally formed with a cylindrical portion 40a, which is connected to the cylindrical portion 72a with female screw of the outer slider 72 through a bearing 74 relatively to rotate and axially to move together.

To the input pulley shaft 18 an annular roller holder 76 is secured by a C ring 78 within the cylindrical portion 40a of the movable input half pulley 40. On the radially outer end of the roller holder 76 there is formed a lug 76a, which projects into a groove between a pair of projected stripes 80, (refer to FIG. 3) axially formed on the inner surface of the cylindrical portion 40a. Moreover the lug 76a is provided with a roller bearing 82 being in slidable contact with opposite inner surfaces of the stripes 80, to make up a guide for the movable input half pulley 40 in the axial direction.

Within the cylindrical portion 40a of the movable input half pulley 40 there is inserted a compression coil spring 84 between the inner surface of a conical portion 40b and the roller holder 76 so that the movable input half pulley 40 is forced to the stationary pulley 38 by the compression coil spring 84.

In the half pulley position control, 42 described above the movable input half pulley 40 guided through the projected stripes 80, and the lug 76a of the roller holder 76 axially moves toward the stationary input half pulley 38 to reduce the width of the V-shaped groove 50 as the outer slider 72 is rotated in one direction by the actuator, or the movable input half pulley 40 moves away from the stationary input half pulley 38 to spread the width of the V-shaped groove 50 as the slider 72 is rotated in the other direction. Moreover, the movable input half pulley 40 is capable of rotating together with the input pulley shaft 18 because of engagement of the projected stripes 80, 80 and the lug 76a. In addition, the movable input half pulley 40 is always loaded in the axial forward direction or the direction in which V-shaped groove 50 is widened while the V belt 60 transmits the rotation to the output pulley 58, and such loading force acts on the supporting portion of the outer slider 72 at the front end of the cylindrical portion 40a. In the half pulley position control 42, however, such loading force is canceled by the force of the compression coil spring 84 so that the loads to the outer slider 72 and also to the bearing 74 are reduced. Besides, the vibration of the movable input half pulley 40 mounted on the rotating shaft 18 is absorbed by the compression coil spring 84 so that noise during the operation is reduced.

Figure 15:
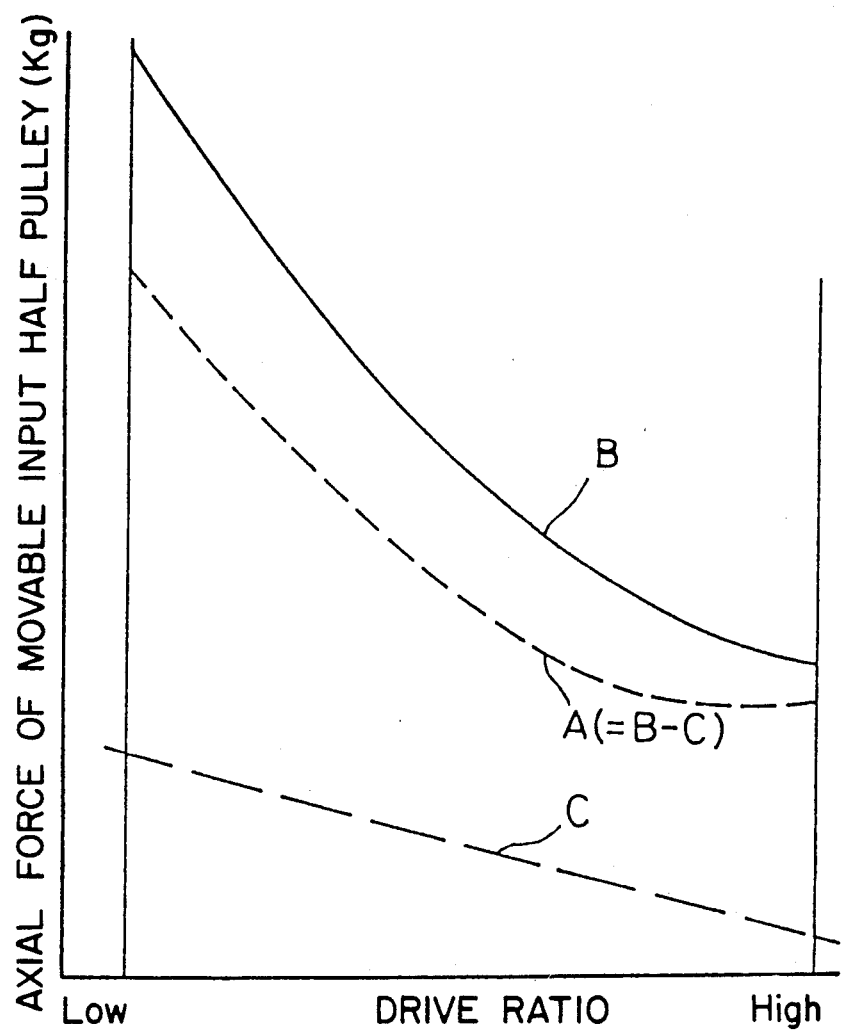
FIG. 15 is a characteristic diagram in the relation between axial forces of the movable input half pulley vs. drive ratios of the V belt type continuously variable transmission shown in FIGS. 2 and 3 compared to those of the prior art.
Figure 16:
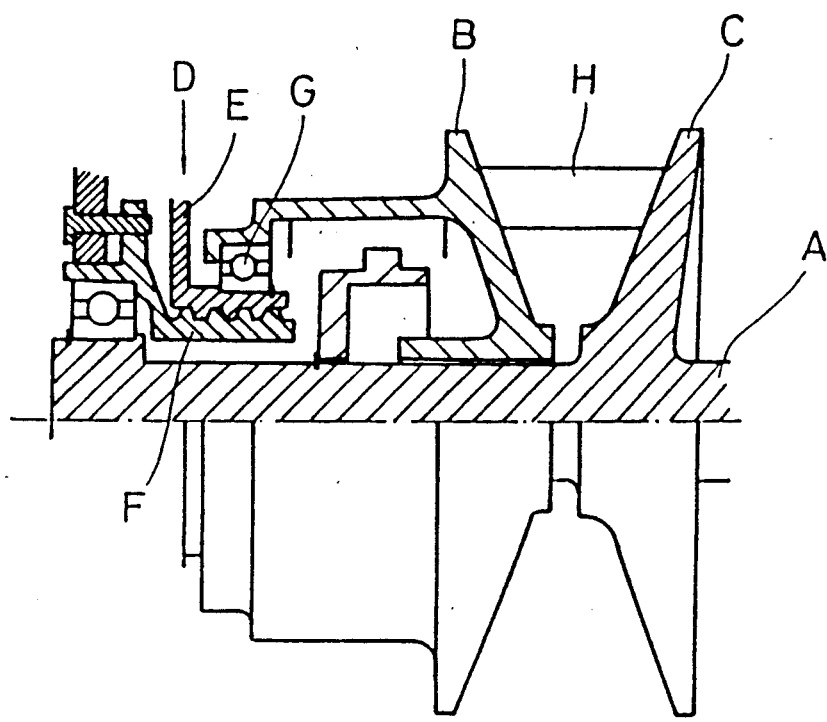
FIG. 16 is a side elevation view, partly in half cross section, of relevant parts of a conventional V belt type continuously variable transmission.

Referring to FIG. 15, there is shown a characteristic diagram in the relation between axial forces (kg) of the movable input half pulley 40 vs. drive ratios of the V belt type continuously variable transmission compared to those of the prior art. In the drawing the curve A shows the characteristic of this embodiment and the curve B shows that of the prior art. In this case the change of the load by the compression coil spring 84 is shown with the curve C in the drawing. It will be appreciated that the significant effect of axial force reduction is obtained in this embodiment comparing to the prior art.

Referring to FIG. 1 again, there is shown a countershaft 86 disposed between the input pulley shaft 18 and the output pulley shaft 44. The countershaft 86 is provided with a 2-way differential clutch 88.

Referring now more particularly to FIG. 4 to 7 in detail, the countershaft 86 has several stepped forms on the peripheral surface. On a stepped part of the countershaft 86 an input gear 90 is slidably mounted through spline 90a. Teeth 90b are formed on the periphery of the input gear 90 and engage with a No. 1 pulley shaft gear 32 of the input pulley shaft 18. Another stepped part of the periphery of the countershaft 86 is provided with a polygonal cam 92 parallel to the input gear 90. An output gear 94 is mounted on the periphery of the polygonal cam 92 with clearance 93. Teeth 94a are formed on the periphery of the output gear 94 and engage with a driven gear 96 of the output pulley shaft 44.

Figure 6:
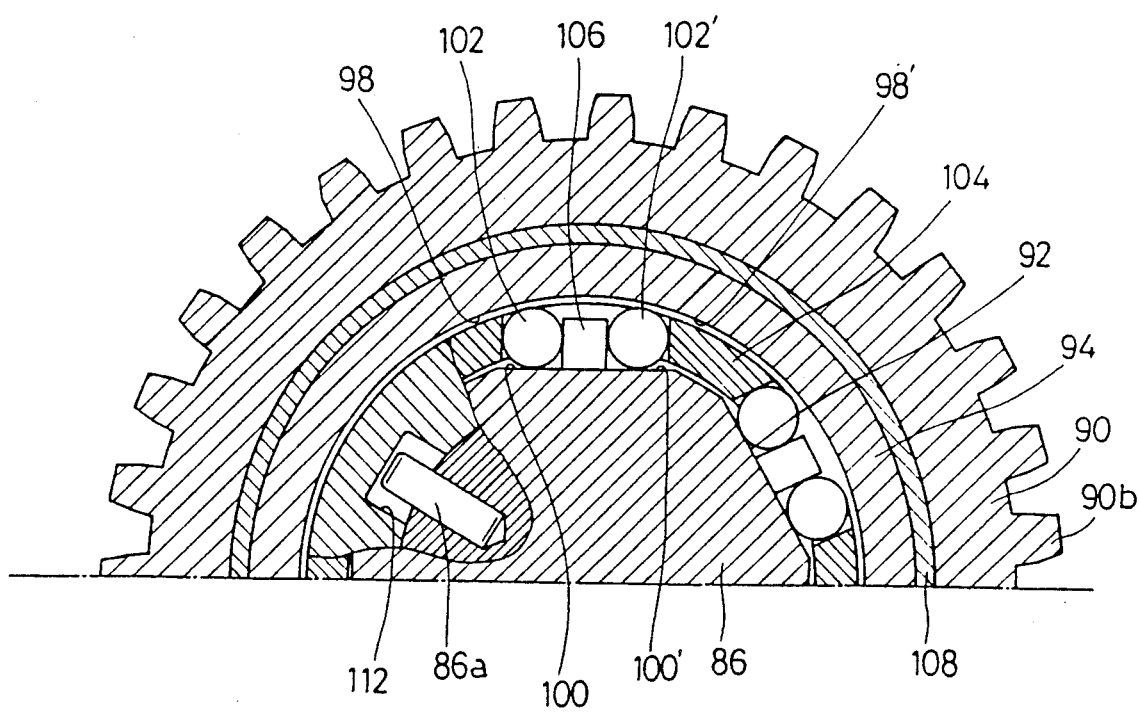
FIG. 6 is an enlarged sectional view of the relevant parts shown in FIG. 5.
Figure 7:
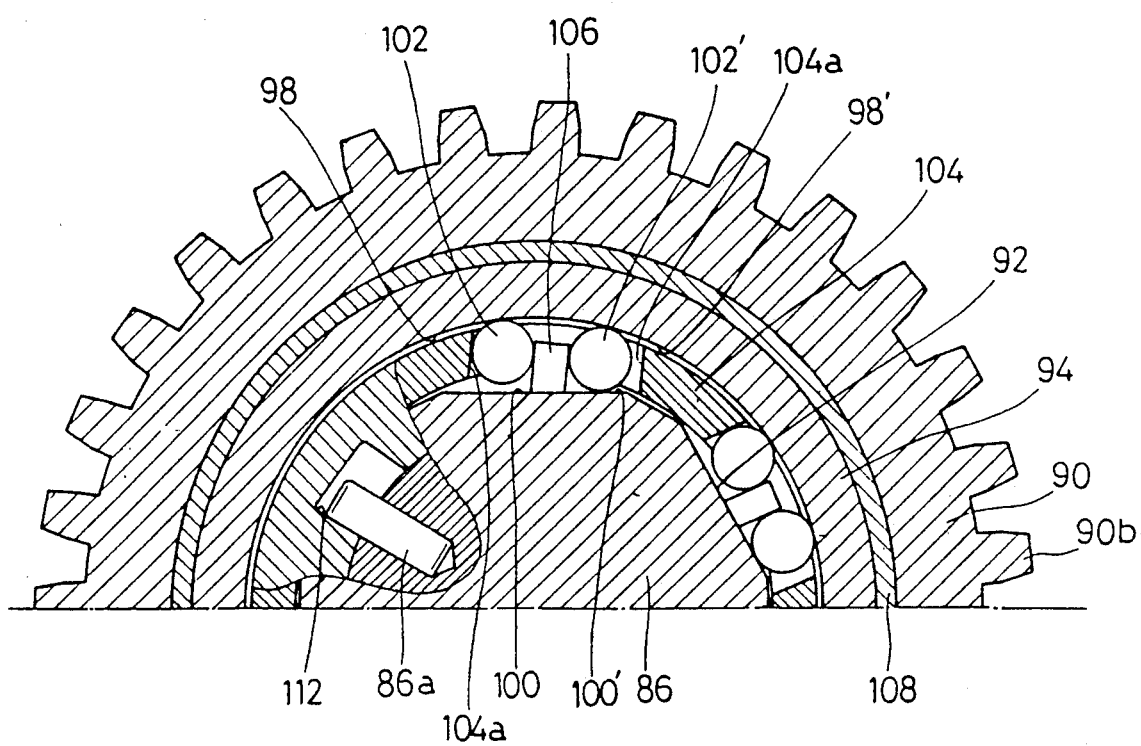
FIG. 7 is an enlarged sectional view similar to that of FIG. 6 in the different operational condition.

Referring to FIG. 6 of enlarged sectional view of the relevant parts, a pair of rollers 102, 102' are disposed on the surrounding surface 98, 98', 100, 100' of double-wedge-shaped clearance 93 (hereinafter referred to as double-wedge-shaped surface) which is formed between the inner cylindrical surface 98 of the output gear 94 and the polygonal cam-shaped surface of the countershaft 86. A pair of the rollers 102, 102' are respectively accommodated in a pocket 104a of a retainer 104, and a spring 106 is disposed between the rollers 102, 102' and urges respective rollers 102, 102' toward the opposite walls of the pocket 104a. It will be noted that the rollers 102, 102' in the neutral condition shown in FIG. 6 do not contact with any of the wedge-shaped surfaces 100, 100'.

Figure 4:
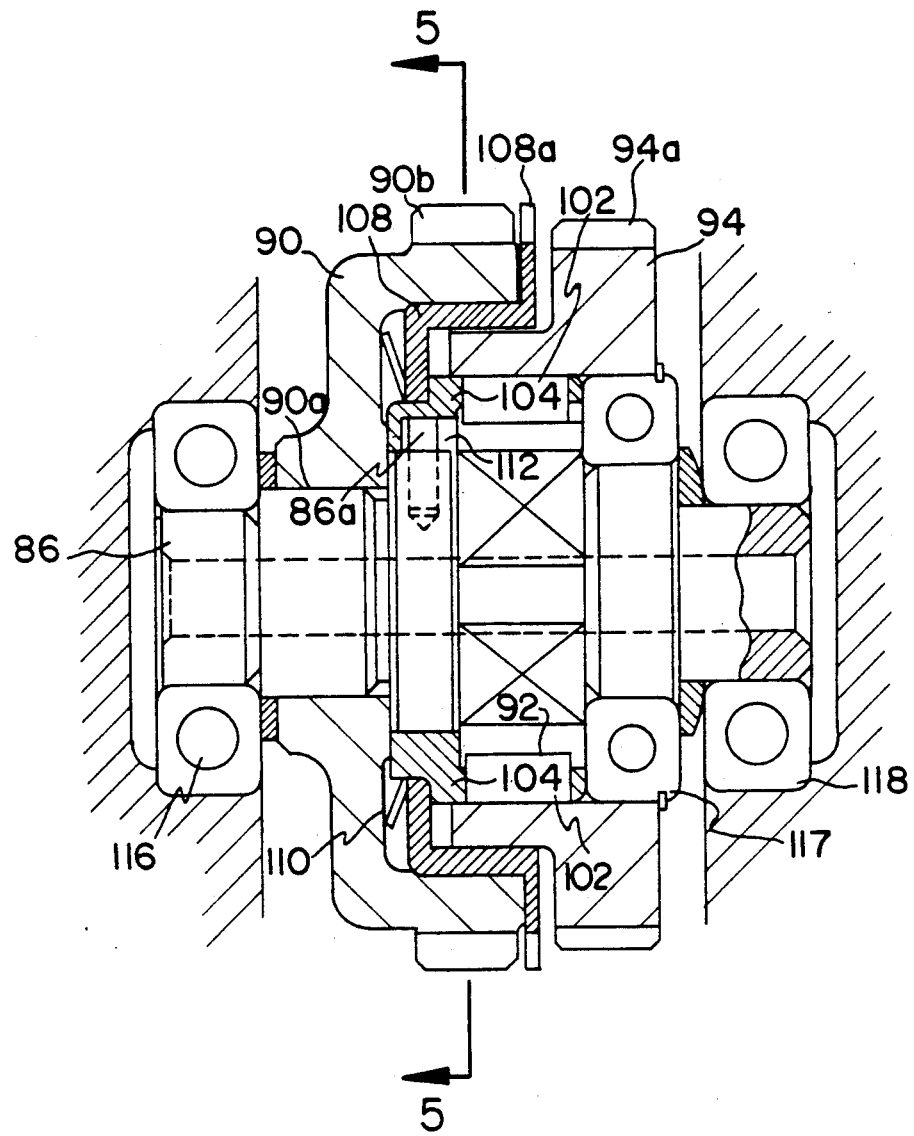
FIG. 4 is a side sectional view of a 2-way differential clutch shown in FIG. 1.
Figure 5:
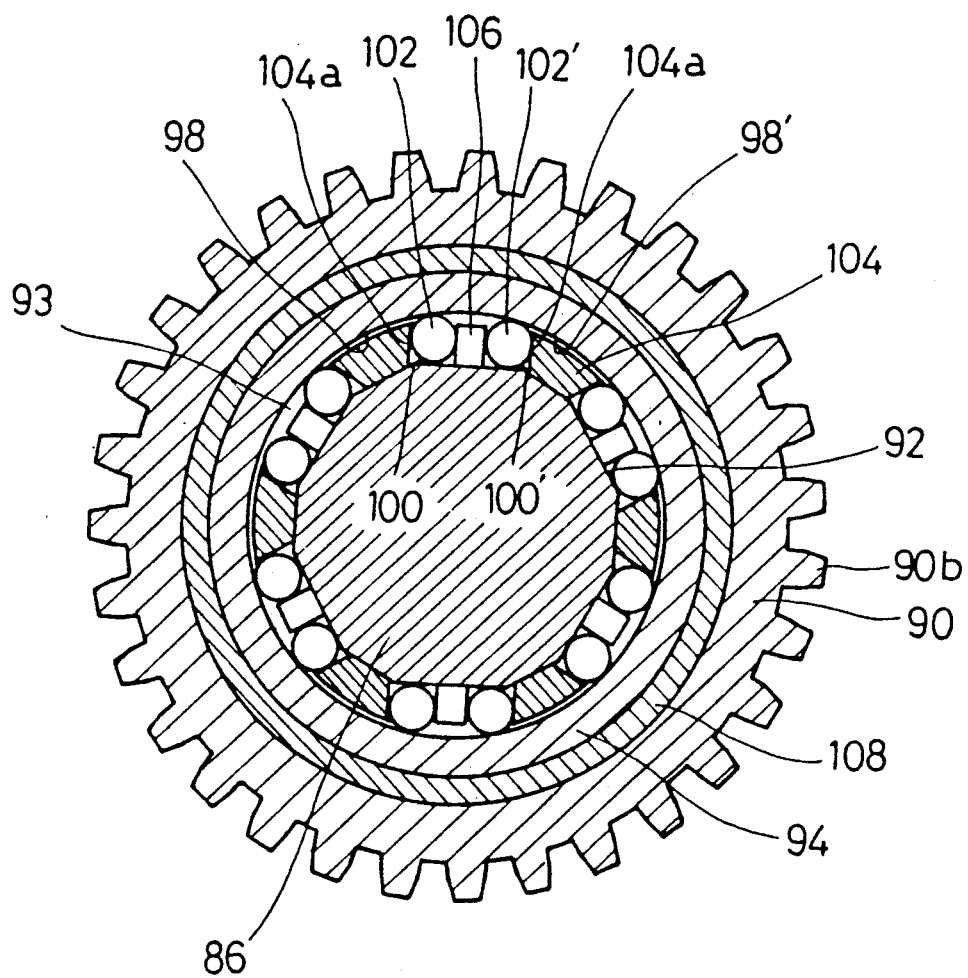
FIG. 5 is a sectional view taken along line V—V in FIG. 4.

Referring to FIG. 4, a sub gear 108 is inserted between the input gear 90 and the output gear 94. Teeth 108a are formed on the periphery of the sub gear 108 and engage the No. 1 pulley shaft gear 32 as is the case of the input gear 90. Within the inner periphery of the sub gear 108 the retainer 104 is slidably mounted on the periphery of the countershaft 86. The retainer 104 and the sub gear 108 are forced with contact to each other by a disc spring 110 between an end surface of stepped portion of the countershaft 86 and a side surface of the input gear 90. A recess 112 is formed in a part of the inner periphery of the retainer 104 while a stopper 86a is projected from a periphery of the countershaft 86 in the position facing to the recess 112. The countershaft 86 is supported by bearings 116 to 118.

In the 2-way differential clutch 88 described above, the rotation of the input pulley shaft 18 is transmitted to the input gear 90 and the sub gear 108 respectively engaging No. 1 pulley shaft gear 32. The number of teeth 90b of the input gear 90 is set to be smaller than that of teeth 108a of the sub gear 108, the number of teeth 90b is 53 while that of tooth 108a are 54 for instance, so that the rotation of the sub gear 108 delays as compared with that of the input gear 90. Consequently, as seen in FIG. 4 the retainer 104 is pressed to contact with the sub gear 108 and has a differential speed against the rotation of the countershaft 86 so that it relatively rotates in the right direction until the left side surface of the recess 112 contacts with the stopper 86a. Then the right side roller 102' of a pair of rollers 102, 102' accommodated in the pocket 104a of the retainer 104 is urged to contact with the wedge-shaped surface 100', 98' by the force of the spring 106. In such condition, when the rotational speed of the output gear 94 is faster than that of the input gear 90, the roller 102' slips and does not stick to the wedge-shaped surface 100', 98'. It will be appreciated that the roller 102 does not stick to the wedge-shaped surface 100, 98 since it does not contact with the surface. On the contrary, when the rotational speed of the output gear 94 is slower than that of the input gear 90, the rotational speed of the polygonal cam 92 becomes faster than that of the output gear 94, and then the roller 102' sticks to the wedge-shaped surface 100', 98' to thereby cause to transmit the rotation of the countershaft 86 to the output gear 94. In this case, after the stopper 86a has contacted with the wall surface of the recess 112, the retainer 104 slips relatively to the sub gear 108 and therefore the sub gear 108 is not damaged. Such wedge effect of the rollers 102, 102' due to the differential speed of the sub gear 102 is caused regardless of the rotational direction of the input gear 90.

Referring to FIG. 1 again, a differential pinion 120 is secured to the output pulley shaft 44 to engage an idler gear 122, which in turn engages a differential gear 126 of a differential gear case 124.

A computer 128 is composed of microprocessors. Signals from an input pulley rotational speed sensor 130 detecting the rotational speed of the input pulley 52, an output pulley rotational speed sensor 132 detecting the rotational speed of the output pulley 58, an half pulley position sensor 134 detecting the position of the movable input half pulley 40 of the input pulley 52, and a sift position sensor, not shown, of the selector 136 are input to the computer 128. The computer 128, depending upon those signals, controls an actuator of the outer slider 72, the actuator which moves the input pulley 52 to control it toward a position appropriate to engine operational conditions.

In the V belt type continuously variable transmission of this invention, after the output power from the prime mover E has been transmitted to the input pulley shaft 18 through the clutch 10 and the synchro-coupling 20, two paths are operable to transmit the output power from the input pulley shaft 18 to the output pulley shaft 58. That is, two paths are a main power transmitting path through a V belt engaged between the input pulley 52 and the output pulley 58 and a sub power transmitting path through the 2-way-differential clutch 88. The drive ratio of the sub power transmitting path is set in a slightly smaller value than the maximum drive ratio of the main power transmitting path.

Consequently, when the movable input half pulley 40 of the output pulley 50 has been moved near the position of the maximum drive ratio in the main power transmitting path, the rotational speed of the output gear 94 in the 2-way differential clutch 88 become slower than that of the input gear 90, and therefore a rotational force is given to the output gear 94 so that the output pulley shaft 44 is rotated through the sub power transmitting path in addition to the main power transmitting path.

Similarly according to such construction, when the selector is manipulated such as D-N-R or R-N-D, the 2-way differential clutch 88 is capable of smoothly switching the transmitting rotational direction by idling and power transmitting.

Figure 8:
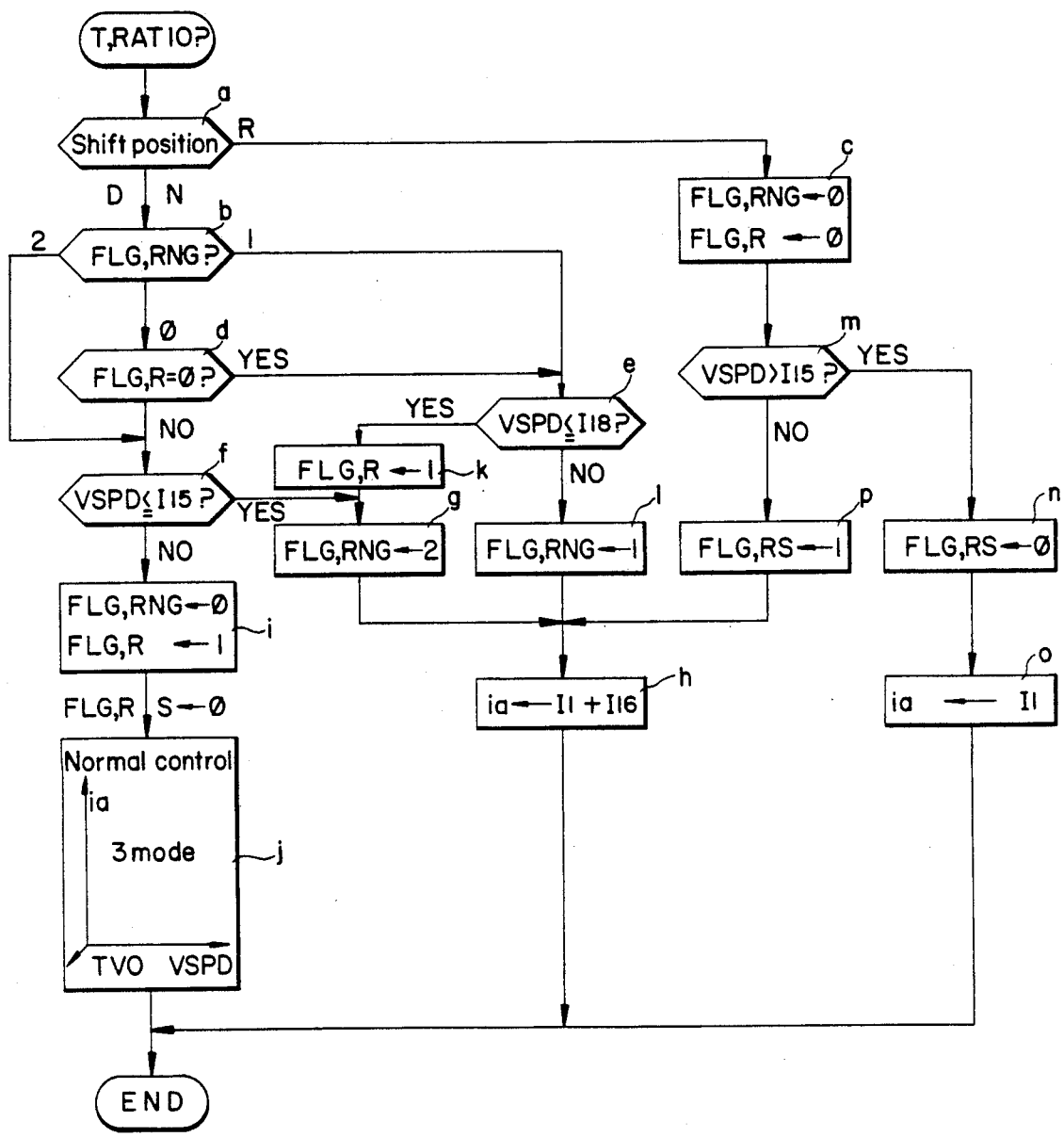
FIG. 8 is a flow chart of controlling by the drive ratio control.
Figure 9:
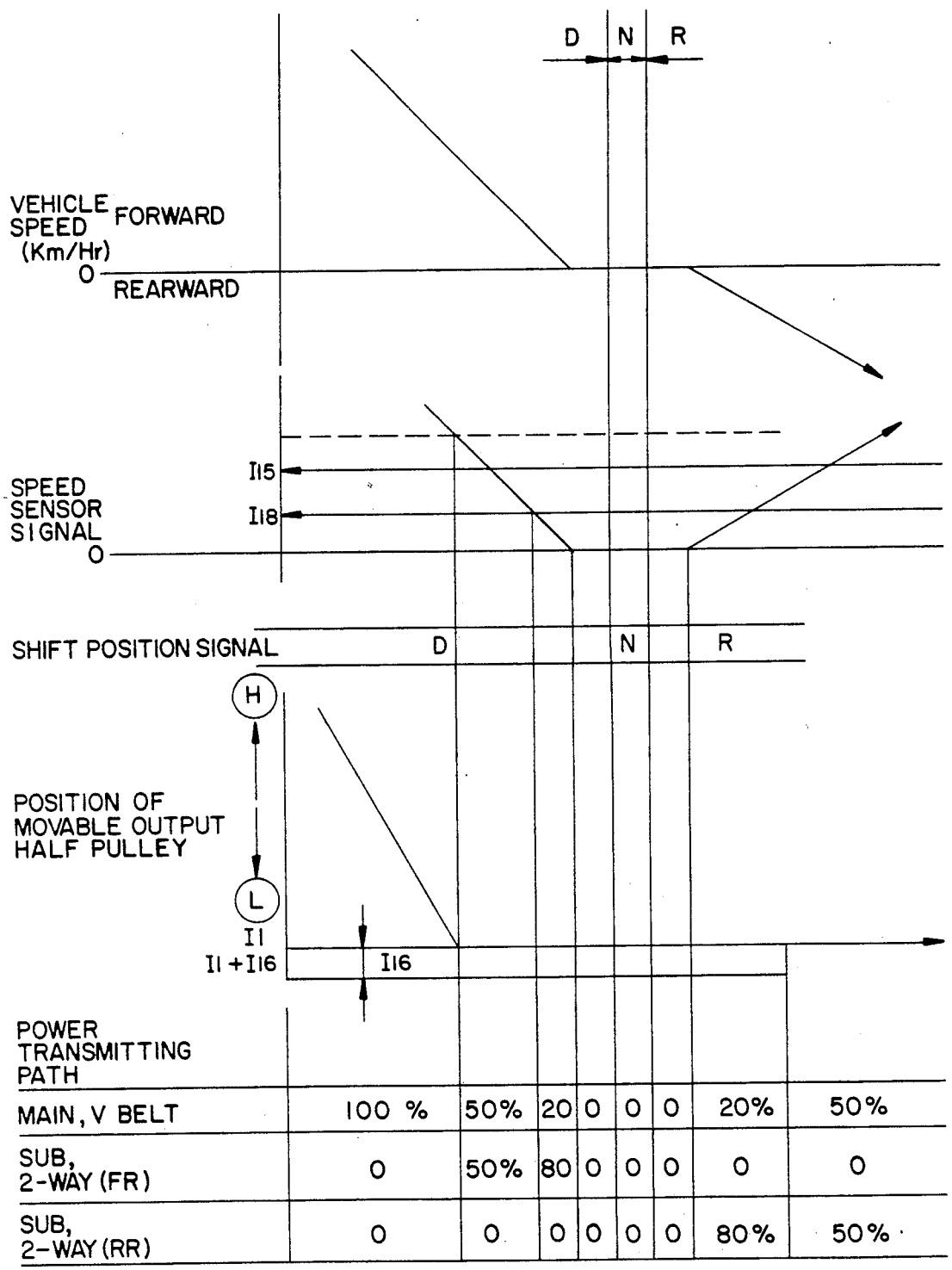
FIG. 9 to FIG. 14 are characteristic diagrams in respective results of controlled position of the movable input half pulley in several shift conditions in relation to load parameters on the main sub power transmitting paths.
Figure 10:
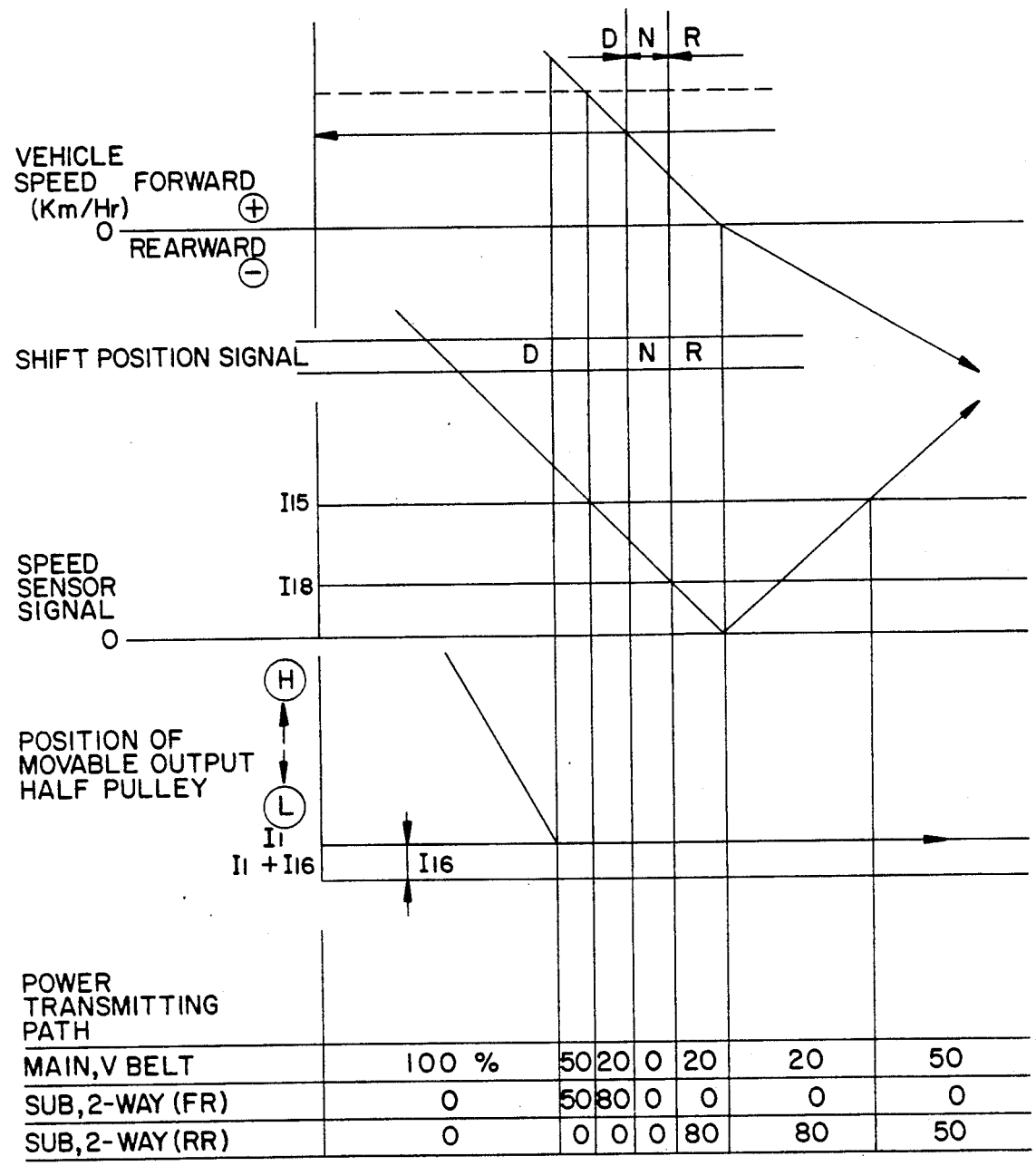
Figure 11:
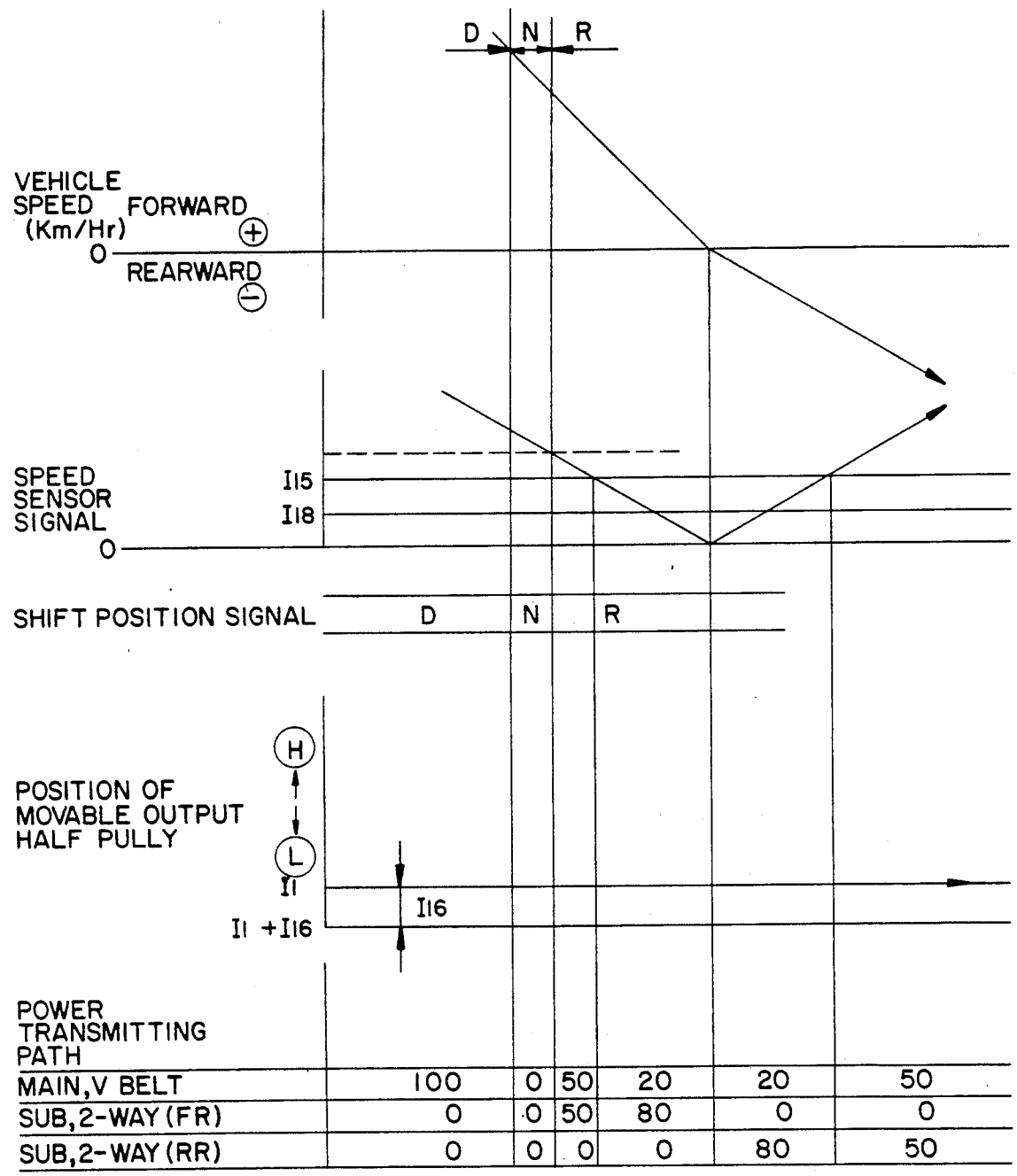
Figure 12:
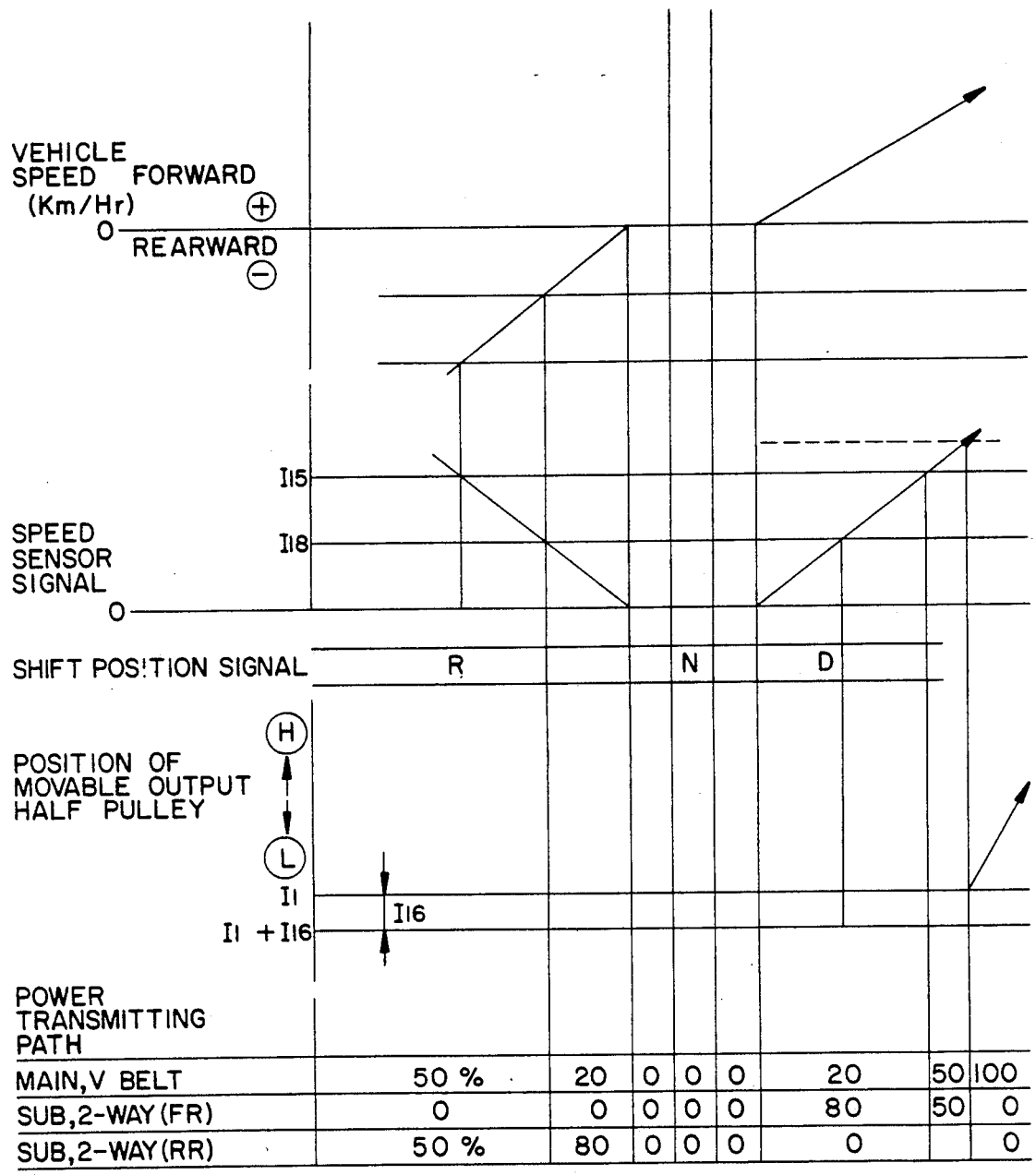
Figure 13:
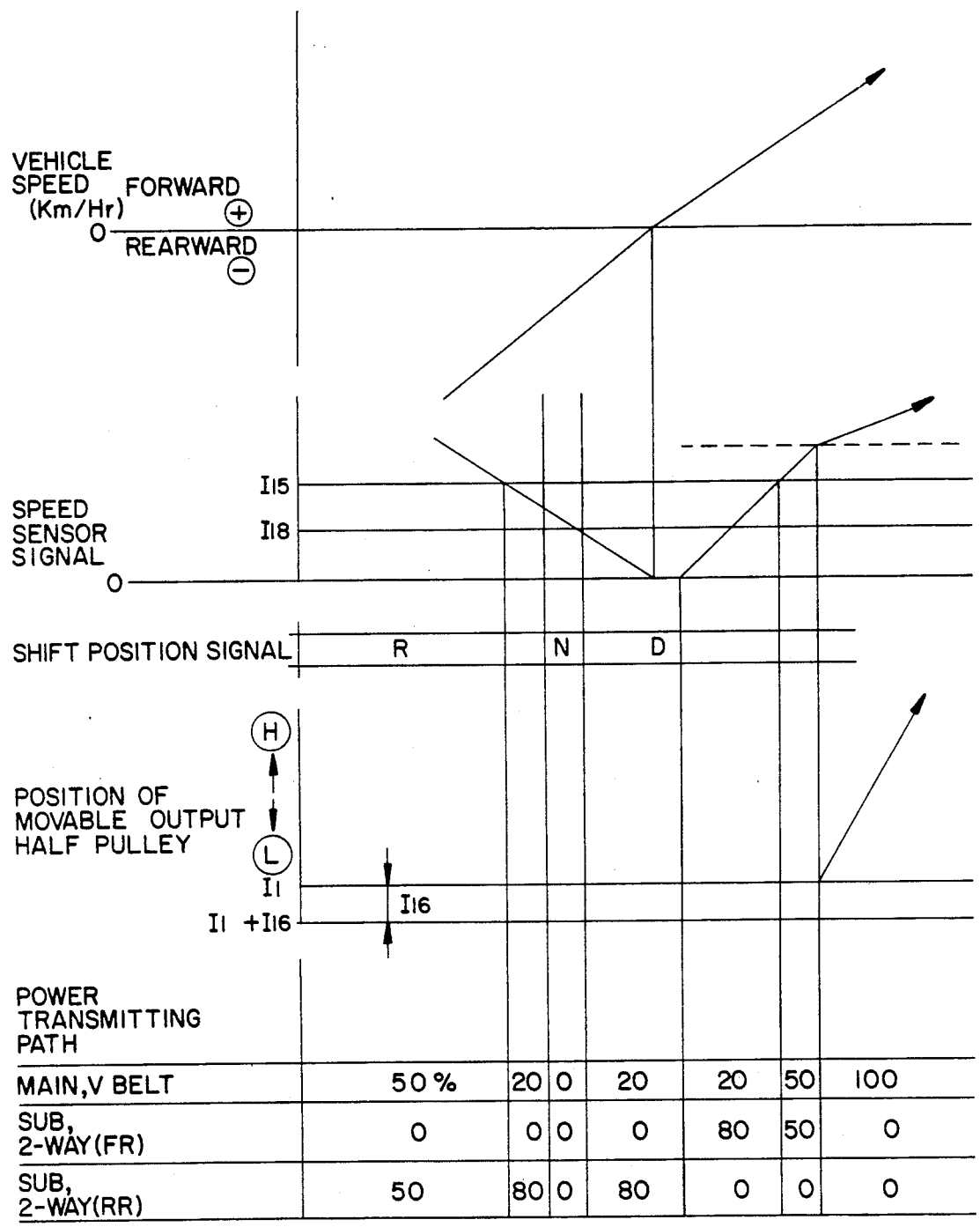
Figure 14:
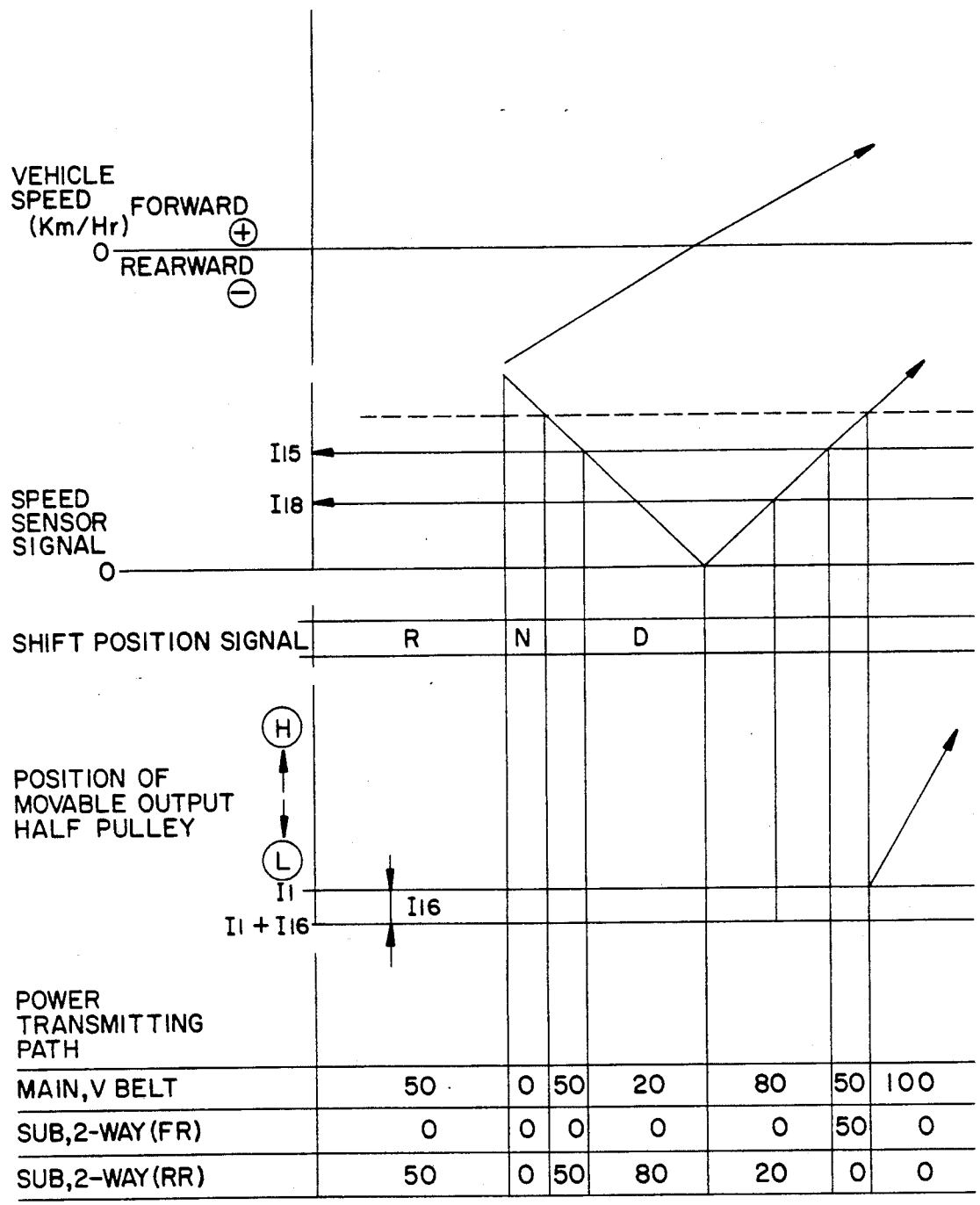

Referring to FIG. 8, there is shown a flow chart of controlling the position of the input pulley 52 through the actuator by the computer 128, wherein;

ia: drive ratio through the main power transmitting path

VSPD: rotational speed of the output pulley shaft 58

TVO: throttle valve open position of the carburetor

FLG RNG: condition flag due to range, vehicle speed

FLG R: flag of R or not

FLG RS: selective flag during R $I_1$: Lowmax $I_{15}$: vehicle speed reference ($I_{15} > I_{18}$)

$I_{16}$: target ratio correction $I_{18}$: vehicle speed reference

Firstly, evaluate shift position in Step a. When shift position is D, N, then go to Step b, and when R, go to Step c. Evaluate condition flag FLG RNG due to range and vehicle speed in Step b. When flag is $\phi$, go to Step d. When flag is 1, then go to Step e. And when flag is 2, then go to Step f. Evaluate FLG R=$\phi$ in Step d. When YES, go to Step e, and when NO, go to Step f. Evaluate VSDP$\leq I_{15}$ in Step f. When YES, go to Step g, where put FLG RNG←2, and go to Step h, where put ia←$I_1$. +$I_{16}$. When NO, go to Step i, where put FLG RNG←$\phi$, FLG R←1, and FLS RS ←$\phi$. Then go to Step j, where get ia which is determined from VSPD and TVO according to normal control.

Evaluate VSPD$\leq I_{18}$ in Step e. When YES, go to Step k, where put FLG R←1 and go to Step g. When NO, go to Step l, where put FLG RNG←1 and go to Step h.

And put FLG RNG←$\phi$ and FLG R←$\phi$ in Step c. Then go to Step m, where evaluate VSPD>$I_{15}$. When YES, go to Step n, where put FLG RS←$\phi$. Then go to Step o, where put ia←$I_1$. When NO, go to Step p, where put FLG RS←1 and go to Step h.

Referring to FIG. 9 to FIG. 14, there are shown respective results of controlled position of the movable input half pulley in several shift conditions in relation to load parameters on the main and sub power transmitting paths.

The V belt type continuously variable transmission according to the present invention is sufficiently operative in the following particular cases during the operation. That is, for instance, if the V belt 60 is cut away, the output power is capable of being transmitted to the output pulley shaft 44 through the 2-way differential clutch 88 in the sub power transmitting path. Similarly, if V belt 60 is stuck into the output pulley 58 due to sudden stop of the vehicle, the stick of V belt 60 can be recovered and smooth restart of the engine is accomplished even if the drive ratio is in high speed side when restarting, because can be varied to the low speed side or the maximum drive ratio, and simultaneously the rotation is transmitted to the output pulley shaft 44 through the 2-way differential clutch 88 in the sub power transmitting path.

What is claimed is:

1. A V belt type continuously variable transmission comprising:

main power transmitting path means including an input pulley mounted on an input pulley shaft, an output pulley mounted on an output pulley shaft and a V belt frictionally engaged between said input and said output pulley, each of said input pulley and said output pulley comprising a pair of half pulleys, one of said half pulley of said input pulley being stationarily mounted to said input pulley shaft and the other of said half pulley of said input pulley being slidably mounted to said input pulley shaft so as to move toward and away from said stationarily mounted half pulley for continuously varying the rotational speed of said output pulley shaft relative to the rotational speed of said input pulley shaft;

sub power transmitting path means distinct from said main power transmitting path means for transmission of rotation of said input pulley shaft to said output pulley shaft, and control means for performance of cooperative power transmission by said main transmitting path means and said sub power transmission path means, said control means being composed of a 2-way differential clutch provided in said sub power transmission path means.

2. The V belt continuously variable transmission as defined in claim 1 wherein said 2-way differential clutch is mounted on a countershaft which is disposed between said input pulley shaft and said output pulley shaft.

* * * * *